(12) United States Patent
Baysah et al.

(10) Patent No.: US 6,662,318 B1
(45) Date of Patent: Dec. 9, 2003

(54) TIMELY ERROR DATA ACQUISTION

(75) Inventors: Irving Guwor Baysah, Austin, TX (US); Michael Anthony Perez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 09/637,314

(22) Filed: Aug. 10, 2000

(51) Int. Cl.$^7$ ............................................. G06F 11/00
(52) U.S. Cl. .............................. 714/48; 714/25; 714/26
(58) Field of Search ............................... 714/48, 26, 57, 714/25, 4

(56) References Cited

U.S. PATENT DOCUMENTS

| | | | | |
|---|---|---|---|---|
| 5,970,149 A | * | 10/1999 | Johnson | 714/46 |
| 6,021,262 A | * | 2/2000 | Cote et al. | 714/48 |
| 6,151,686 A | * | 11/2000 | McDonough et al. | 714/37 |
| 6,170,067 B1 | * | 1/2001 | Liu et al. | 714/48 |
| 6,269,460 B1 | * | 7/2001 | Snover | 714/48 |
| 6,298,457 B1 | * | 10/2001 | Rachlin et al. | 714/49 |
| 6,327,677 B1 | * | 12/2001 | Garg et al. | 714/37 |
| 6,343,311 B1 | * | 1/2002 | Nishida et al. | 709/203 |
| 6,373,383 B1 | * | 4/2002 | Arrowsmith et al. | 340/506 |
| 6,425,006 B1 | * | 7/2002 | Chari et al. | 709/224 |
| 6,477,667 B1 | * | 11/2002 | Levi et al. | 714/57 |
| 6,487,677 B1 | * | 11/2002 | Jantz et al. | 714/2 |

* cited by examiner

Primary Examiner—Scott Baderman
Assistant Examiner—Yolanda L Wilson
(74) Attorney, Agent, or Firm—Duke W. Yee; Mark E. McBurney; Wayne P. Bailey

(57) ABSTRACT

A method, system, and apparatus for monitoring errors within a data processing system is provided. In one embodiment an error notification system receives an indication of notification conditions and actions from a user. The system then searches for the specified conditions. Responsive to the occurrence of the specified condition, the system performs specified actions and sends a notification to a user. The specified actions may include, for example, rebooting the computer or generating a web page of information regarding the occurrence of the condition. The notification may be sent to a user via, for example, e-mail.

21 Claims, 3 Drawing Sheets

TIMELY ERROR DATA ACQUISTION

BACKGROUND OF THE INVENTION

1. Technical Field

The present invention relates to an improved data processing system and, more particularly, to management of errors within the data processing system.

2. Description of Related Art

The "Internet" is a worldwide network of computers Today, the Internet is made up of more than 65 million computers in more than 100 countries covering commercial, academic and government endeavors. Originally developed for the U.S. military, the Internet became widely used for academic and commercial research. Users had access to unpublished data and journals on a huge variety of subjects. Today, the Internet has become commercialized into a worldwide information highway, providing information on every subject known to humankind.

The Internet's surge in growth in the latter half of the 1990s was twofold. As the major online services (AOL, CompuServe, etc.) connected to the Internet for e-mail exchange, the Internet began to function as a central gateway. A member of one service could finally send mail to a member of another. The Internet glued the world together for electronic mail, and today, the Internet mail protocol is the world standard.

Secondly, with the advent of graphics-based Web browsers such as Mosaic and Netscape Navigator, and soon after, Microsoft's Internet Explorer, the World Wide Web took off. The Web became easily available to users with PCs and Macs rather than only scientists and hackers at UNIX workstations. Delphi was the first proprietary online service to offer Web access, and all the rest followed. At the same time, new Internet service providers rose out of the woodwork to offer access to individuals and companies. As a result, the Web has grown exponentially providing an information exchange of unprecedented proportion. The Web has also become "the" storehouse for drivers, updates and demos that are downloaded via the browser.

Web content provided to browser users is stored on web or enterprise servers connected to the Internet. Many businesses utilize their enterprise servers, not just to advertise or provide information about their business, but also to conduct business. In fact, many businesses are purely "Internet" or dot com businesses. In conducting their "on-line" businesses, these companies rely on their enterprise servers to be "up" and functioning to receive orders for products from customers. Failures of these enterprise servers may and often do result in lost revenue due to lost sales for the business. For many businesses, lost revenue from just a few hours of down time for the enterprise server may be catastrophic.

Therefore, time is critical to the development and serviceability of enterprise server. The amount and frequency of transactions performed on enterprise servers will continue to increase dramatically. The workload of these e-business engines will prove very stressful for any system or piece of hardware and downtime will be eminent. Therefore, the need for an enterprise server to maintain high Reliability, Availability and Serviceability (RAS), becomes very important to an Information Technology (IT) Specialist or customer. In addition to RAS, faster system development cycles will be necessary for any business, to compete in this arena.

Whether it is at a customer site or in the lab, too much time is wasted diagnosing failure modes or problems. In many cases, this is simply because we are unaware of when a particular error occurs. Therefore, there is a need for a mechanism to notify an operator or a developer when a specific error has occurred.

SUMMARY OF THE INVENTION

The present invention provides a method, system, and apparatus for monitoring errors within a data processing system. In one embodiment an error notification system receives an indication of notification conditions and actions from a user. The system then searches for the specified conditions. Responsive to the occurrence of the specified condition, the system performs specified actions and sends a notification to a user. The specified actions may include, for example, rebooting the computer or generating a web page of information regarding the occurrence of the condition. The notification may be sent to a user via, for example, e-mail.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
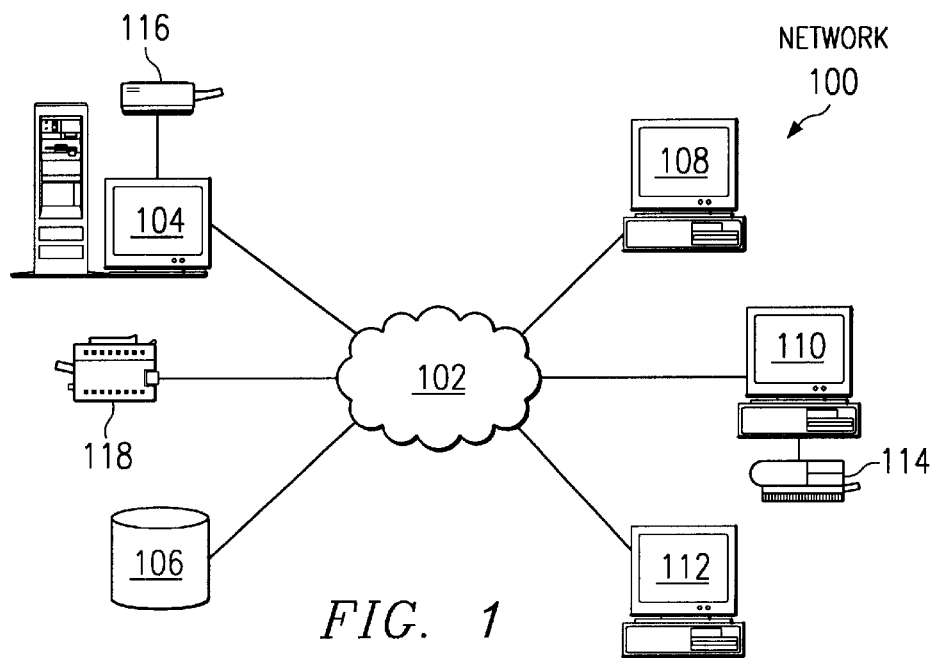
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
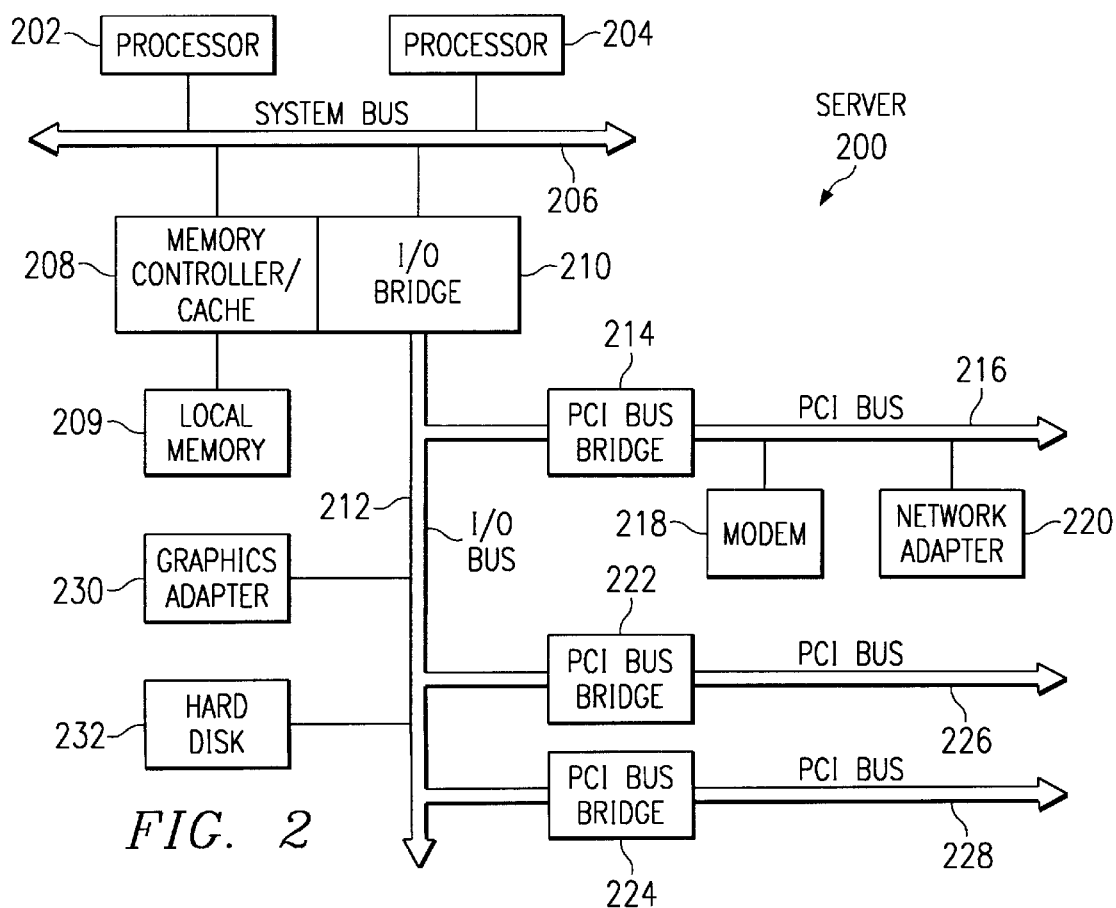
FIG. 2 depicts a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
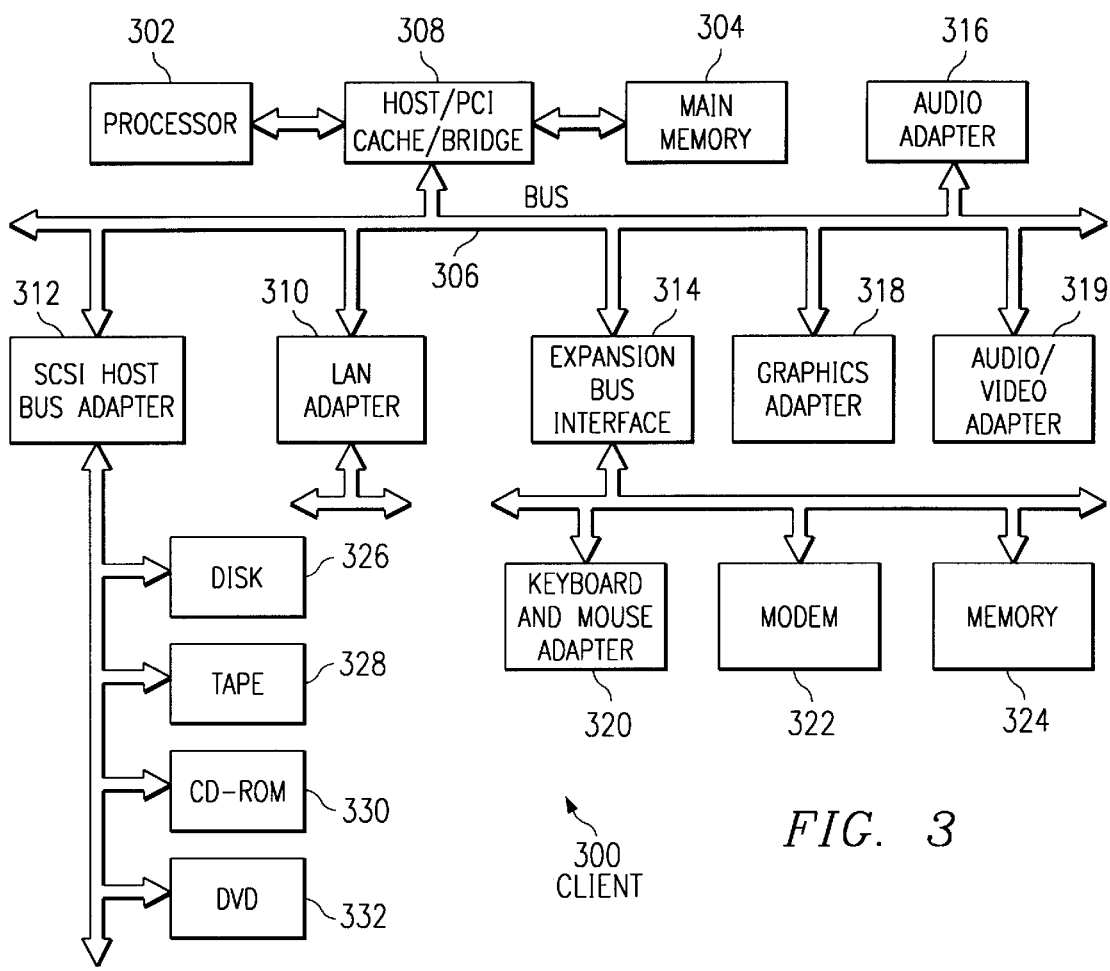
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
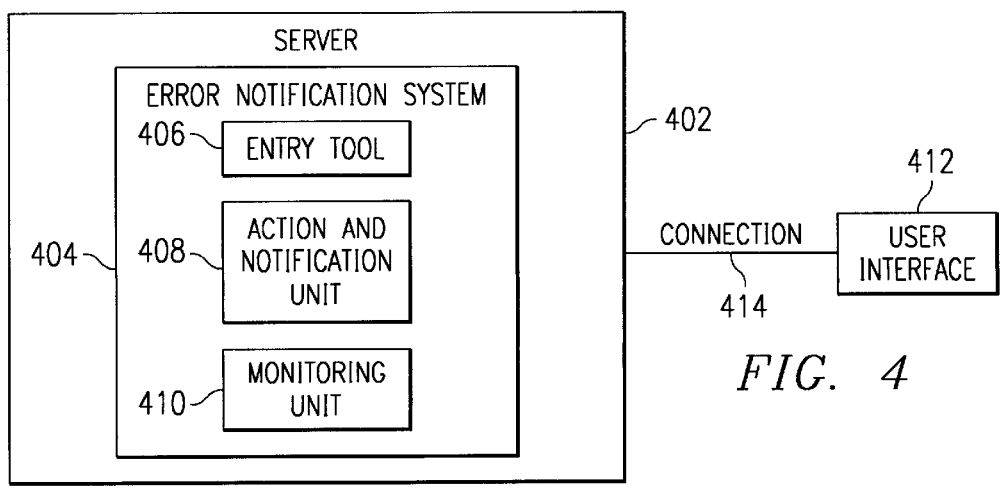
FIG. 4 depicts a block diagram illustrating an exemplary error notification system in accordance with the present invention.

With reference now to FIG. 4, a block diagram illustrating an exemplary error notification system is depicted in accordance with the present invention. Error notification system 404 is implemented on a server 402, which may be implemented as, for example, server 200 in FIG. 2. Server 402 is connected to a network (not shown), such as network 102 in FIG. 1.

Error notification system 404 includes an entry tool 406 that allows a user to make choices about the types of errors to monitor, conditions that must occur before taking actions and notifying persons, the actions to perform on the occurrence of these conditions, the person or persons to notify on the occurrence of these conditions, and the method of notifying the person or persons. Other parameters may also be entered using entry tool 406 depending on the implementation. Error notification system 404 also includes a monitoring unit to monitor the server 402 for the particular error conditions selected by a user and an action and notification unit 408 to perform requested actions and notification upon the occurrence of the condition specified by the user.

In the depicted embodiment, the entry tool 406 for the error notification system 404 is implemented as a Java application web-based software stored on a server, such as server 200. However, the entry tool 406 also provides the ability of the user to input the data for the notification and action conditions from a command line prompt, as well as from the graphical user interfaced web based software product. The web-based application calls an underlying subroutine or subcommand which executes the diagnostic program to execute the error notification system. Moreover, the subcommand is available from a command line so that a user may modify the conditions of notification with the entry tool from an ASCII terminal if necessary.

An operator may use a Java-based, menu-driven, command line or a web-based application tool on user interface 412 to access entry tool 406 via connection 414. The user interface may be a personal computer or laptop implement as, for example, data processing system 300 in FIG. 3. However, other types of user interfaces may be used as well, such as, for example, a personal digital assistant (PDA) connected to a network, such as, for example, network 102 in FIG. 1 via a wireless connection. Connection 414 may be provided via use of a network, such as network 102 in FIG. 1, or may provide a direct connection between user interface 412 and server 402, such as connecting a video display terminal and keyboard to input/output adapters within server 402. Furthermore, connection 414 may include numerous connections rather than a single discrete connection and some or all of these connections may involve wireless technology, such as, for example, utilized by wireless cell phones.

This Java-based, menu-driven, command line or a web-based application tool allows the user to enter the particular error condition that the user wishes error notification system 404 to search for. An operator or developer may also provide the error notification system 404 with an indication of the number of occurrences of the error the system should count prior to notification. The user may also, for example, select how to be notified (e.g., via a pager, e-mail, or web update), and choose what information should be provided and whether or not the system should be rebooted after an error.

Thus, the present invention allows a user, such as a enterprise server administrator or a servicing technician to receive notification of the occurrence of certain kinds of errors within the enterprise server. The notification includes the level of detail as described by the end user as entered into error notification system 404 via entry tool 406.

The following examples may aid in illustrating the functioning of the present invention. In a first example, consider an administrator waiting for a network card to report five transmit errors. The administrator may pull up a web browser, access the web based error notification system 404, set the action and notification unit 408 using entry tool 406 to notify the administrator of the occurrence indicating the occurrence of the condition via the administrator's wireless pager, send an e-mail to the administrator's office workstation indicating the occurrence of the condition, and update a web page after the fifth error occurred. The administrator may also set the action and notification unit 408 to provide full details of the error data versus providing only the header.

Continuing with this example, perhaps the administrator is in the laboratory and realizes that he wishes to be notified after the occurrence of the first error rather than the fifth. However, the administrator may only have an ASCII terminal near by. (An ASCII terminal is incapable of displaying graphical user interface browsers) Thus, the administrator may change the command within the action and notification unit 408 to modify the parameter for number of occurrences of the error to occur before notification from five (5) to one (1) using the command line at the ASCII terminal.

In a second example, consider a servicing technician waiting for the server 400 system to crash due to a machine check interrupt condition. The servicing technician may program the error notification system 404 to reboot the server 400 on the failure, send a page to the technician's pager instead of an e-mail (since the technician is away from the office), and update a web page with the detailed data. The reboot command instructs the server 400 to enable the reboot policy. When the server 400 hits the error, it crashes, reboots, gathers the desired information, and pages the technician. Once, the technician receives the page, the technician may then access the web page generated or updated by the error notification system 404 with a laptop via the Internet and look at the data from the web page.

In a third example, consider a Customer Engineer (CE) for several servers located in several different locations. The CE setups the diagnostic program (i.e. the action and notification unit 408) to report a reconfigured processor or memory by paging the CE and updating the web-page with the type of error and the location of the system. In such a situation, the error notification system 404 may be located on a remote server to the servers that it is monitoring. Then, the CE may warn the customers of the situation in order to plan for a downtime.

The error notification system 404 may also be modified to determine who to send the e-mail to based on error type. For example, Person A could be notified for a "crashed" server, person B for network errors, and person C for scsi errors. The error notification system 404 may also include an option where an Operating System dump is taken for certain error types.

The implementation of this error notification system will make for faster development cycles and prompt customer service. Developers and Customer Engineers will be able to respond to problems, as they occur, in a timely manner. Furthermore, error notification system 400 makes for a more effective e-business machine or server.

Those of ordinary skill in the art will appreciate that the components in FIG. 4 may vary depending on the implementation. For example, although the error notification system 404 has been described primarily with reference to operating on and monitoring a single server, error notification system 404 may also be implemented, as described above to monitor other servers than the server on which the error notification system is operating. Furthermore, error notification system 404 may also monitor workstations, client computers, and other devices within a network. The depicted example is not meant to imply architectural limitations with respect to the present invention.

Figure 5:
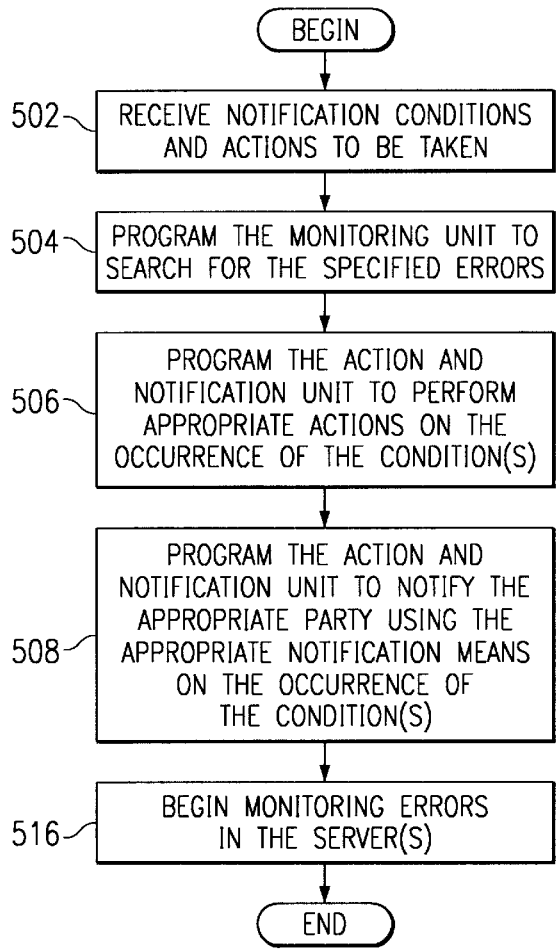
FIG. 5 depicts a flowchart illustrating an exemplary method of entering notification and action conditions into an error notification system in accordance with the present invention.

With reference now to FIG. 5, a flowchart illustrating an exemplary method of entering notification and action conditions into an error notification system is depicted in accordance with the present invention. To being, an entry tool within an error notification system, such as, for example, entry tool 406 within error notification system 404 in FIG. 4, receives notification conditions and actions to be taken from a user (step 502). These conditions may indicate, for example, the type of error to be monitored, the number of times the error should occur before notification, and on which server the error occurred. Actions to be taken may include, for example, rebooting the computer, generating a web page with information about the error(s). The actions may also indicate the person(s) to be notified on the occurrence of a specified event and how the person(s) is to be notified. The person may be notified in more than one way for a given occurrence. More than one person may be notified depending on the choices made by the user. Furthermore, the user may specify that different types of errors result in different persons being notified. These are merely examples of some conditions which the user may specify. However, other types of conditions may be used as will be recognized to one skilled in the art.

Once the notification conditions and actions have been entered, the entry tool reprograms the monitoring unit to search for the specified error(s) (step 504). The entry tool then reprograms the Action and Notification Unit to perform appropriate action(s) on the occurrence of the condition(s) specified by the user (step 506). The entry tool also programs the Action and Notification Unit to notify the appropriate party(s) using the appropriate notification means as specified by the user on the occurrence of the specified condition(s) (step 508). The error notification system then begins monitoring the errors within the server(s) (step 516).

Figure 6:
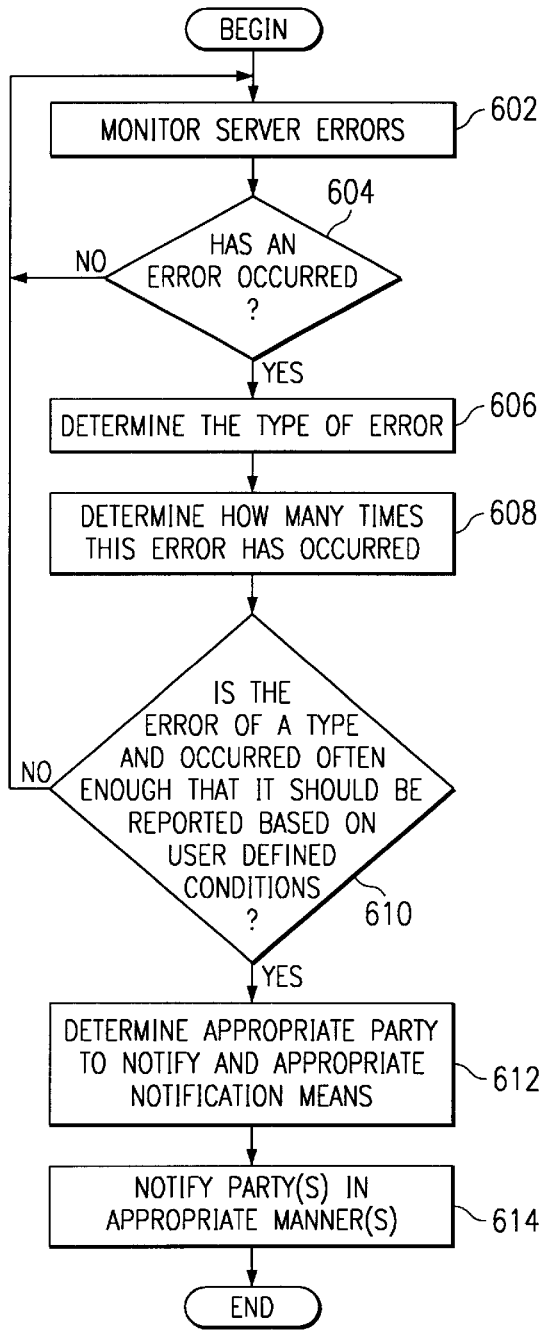
FIG. 6 depicts a flowchart illustrating an exemplary method of providing error notification to a user in accordance with the present invention.

With reference now to FIG. 6, a flowchart illustrating an exemplary method of providing error notification to a user is depicted in accordance with the present invention. To begin, the error notification system, such as, for example, error notification system 404 in FIG. 4, monitors the data processing system for errors (step 602). The error notification system then determines whether an error has occurred (step 604). If no error has occurred, then the error notification system continues to monitor the data processing system for errors (step 602). If an error has occurred, then the error notification system determines the type of the error (step 606) and how many times this type of error has occurred (step 608).

The error notification system then determines whether the error is of the type specified and has occurred often enough, as well whether any other conditions have been met in order to report the error to the user (step 610). If all the conditions have not been met, then the error notification system continues to monitor for more errors (step 602). If all the conditions have been met, then the error notification system performs any actions, such as, for example, rebooting the data processing system, specified by the user as well as determines the appropriate party or parties to notify and the appropriate notification means (step 612). The error notification system then notifies the appropriate party or parties in the appropriate manner or manners (step 614). For example, the party or parties may be notified by e-mail or by page to a wireless paging device. Furthermore, a web page containing a description of the error and its circumstances may also be generated for the user to access and view.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring errors within a data processing system, the method comprising:
monitoring a data processing system for an occurrence of a specified condition; and
responsive to the occurrence of the specified condition, performing specified actions and sending a notification to a user, wherein the specified condition comprises a plurality of conditions and a different party is notified on the occurrence of each of the plurality of conditions.

2. The method as recited in claim 1, wherein the data processing system is a server.

3. The method as recited in claim 1, wherein the data processing system is a distributed data processing system comprising a plurality of servers.

4. The method as recited in claim 1, wherein the notification comprises sending an electronic mail message.

5. The method as recited in claim 1, wherein the notification comprises sending a notification to a wireless pager.

6. The method as recited in claim 1, wherein the specified actions comprise generating a web page containing information about the specified occurrence.

7. The method as recited in claim 1, wherein the specified actions comprise rebooting the data processing system.

8. A computer program product in a computer readable media for use in a data processing system for monitoring errors within a monitored data processing system, the computer program product comprising:
first instructions for monitoring the monitored data processing system for an occurrence of a specified condition; and
second instructions, responsive to the occurrence of the specified condition, for performing specified actions and sending a notification to a user, wherein the specified condition comprises a plurality of conditions and a different party is notified on the occurrence of each of the plurality of conditions.

9. The computer program product as recited in claim 8, wherein the data processing system is a server.

10. The computer program product as recited in claim 8, wherein the monitored data processing system is a distributed data processing system comprising a plurality of network computers, each of which is monitored.

11. The computer program product as recited in claim 8, wherein the notification comprises sending an electronic mail message.

12. The computer program product as recited in claim 8, wherein the notification comprises sending a notification to a wireless pager.

13. The computer program product as recited in claim 8, wherein the specified actions comprise generating a web page containing information about the specified occurrence.

14. The computer program product as recited in claim 8, wherein the specified actions comprise rebooting the monitored data processing system.

15. A system for monitoring errors within a monitored data processing system, the system comprising:

first means for monitoring the monitored data processing system for an occurrence of a specified condition; and second means, responsive to the occurrence of the specified condition, for performing specified actions and sending a notification to a user, wherein the specified condition comprises a plurality of conditions and a different party is notified on the occurrence of each of the plurality of conditions.

16. The system as recited in claim 15, wherein the data processing system is a server.

17. The system as recited in claim 15, wherein the monitored data processing system is a distributed data processing system comprising a plurality of network computers, each of which is monitored.

18. The system as recited in claim 15, wherein the notification comprises sending an electronic mail message.

19. The system as recited in claim 15, wherein the notification comprises sending a notification to a wireless pager.

20. The system as recited in claim 15, wherein the specified actions comprise generating a web page containing information about the specified occurrence.

21. The system as recited in claim 15, wherein the specified actions comprise rebooting the monitored data processing system.

* * * * *